(12) United States Patent
Rose

(10) Patent No.: US 10,348,075 B2
(45) Date of Patent: Jul. 9, 2019

(54) FIREWALL INSERT BOX

(71) Applicant: FIREBLOK IP HOLDINGS, LLC., Atlanta, GA (US)

(72) Inventor: Elmer Algin Rose, Grand Saline, TX (US)

(73) Assignee: Fireblok IP Holdings, LLC., Atlanta, GA (US)

( * ) Notice: Subject to any disclaimer, the term of this patent is extended or adjusted under 35 U.S.C. 154(b) by 0 days.

(21) Appl. No.: 15/958,382

(22) Filed: Apr. 20, 2018

(65) Prior Publication Data

US 2018/0337523 A1 Nov. 22, 2018

Related U.S. Application Data

(63) Continuation of application No. 15/611,484, filed on Jun. 1, 2017, now Pat. No. 9,954,348, which is a
(Continued)

(51) Int. Cl.
*H02G 3/08* (2006.01)
*H02G 3/04* (2006.01)
(Continued)

(52) U.S. Cl.
CPC ............ *H02G 3/088* (2013.01); *H01R 13/10* (2013.01); *H01R 13/405* (2013.01); *H01R 24/20* (2013.01);
(Continued)

(58) Field of Classification Search
CPC .......... H02G 3/08; H02G 3/081; H02G 3/086; H02G 3/0412; H02G 3/088; H02G 3/10; H02G 3/123; H05K 5/00; H05K 5/02; H05K 5/0213; H05K 5/069; H01H 9/02; H01H 9/904; H01H 13/04; H01H 13/06;
(Continued)

(56) References Cited

U.S. PATENT DOCUMENTS 4,087,624 A * 5/1978 Hitchcock .............. H02G 3/088
174/57
4,134,636 A * 1/1979 Kleinatland ........... H02G 3/123
174/58
(Continued)

OTHER PUBLICATIONS

Office Action, dated Dec. 1, 2016, in connection with U.S. Appl. No. 15/018,619.
(Continued)

*Primary Examiner* — Angel R Estrada
(74) *Attorney, Agent, or Firm* — Meunier Carlin & Curfman LLC

(57) ABSTRACT

The invention described herein is a fire protection device in the form of an insert designed to be quickly installed in new or existing electrical boxes located in firewalls. This insert is comprised of a material designed to withstand high direct heat and serve as a barrier to the passage of direct heat or smoke and gases through firewalls rated under ASTM E-119. The insert features a flanged open end which overlaps any gaps between the existing electrical box and the wall. The back wall of the insert box may have either openings to permit wires to pass through to the electrical device or a plug-harness assembly which obviates the use of holes in the back of the insert box.

16 Claims, 6 Drawing Sheets

Related U.S. Application Data continuation of application No. 15/018,619, filed on Feb. 8, 2016, now abandoned, which is a continuation of application No. 14/147,091, filed on Jan. 3, 2014, now Pat. No. 9,258,919.

(51) Int. Cl.
  *H01R 13/10* (2006.01)
  *H01R 13/405* (2006.01)
  *H01R 24/20* (2011.01)
  *H02G 3/12* (2006.01)
  *H01R 107/00* (2006.01)

(52) U.S. Cl.
  CPC ....... *H02G 3/0412* (2013.01); *H01R 2107/00* (2013.01); *H02G 3/123* (2013.01)

(58) Field of Classification Search
  CPC ...... H01H 19/04; H01H 19/06; H01R 13/527; H01R 13/52; H01R 13/46; H01R 13/10; H01R 13/405; H01R 24/20; H01R 2107/00
  USPC ....... 174/480, 481, 50, 53, 57, 58, 520, 539, 174/559, 564, 66, 67, 565, 541; 220/3.2–3.9, 4.02, 241, 242, 88.1, 88.2; 361/600, 601, 676; 169/48
  See application file for complete search history.

(56) References Cited

U.S. PATENT DOCUMENTS

| | | | | |
|---|---|---|---|---|
| 5,117,996 A * | 6/1992 | McShane | ............... | H02G 3/121 174/57 |
| 5,471,012 A * | 11/1995 | Opel | ............... | H02G 3/16 174/53 |
| 6,204,447 B1 * | 3/2001 | Gretz | ............... | H02G 3/121 174/50 |
| 6,252,167 B1 * | 6/2001 | Rose | ............... | H02G 3/088 174/66 |
| 6,937,461 B1 * | 8/2005 | Donahue, IV | ....... | H01R 13/514 174/50 |
| 6,953,894 B2 * | 10/2005 | Ungerman | ............. | H02G 3/086 174/502 |
| 7,425,677 B2 * | 9/2008 | Gates | ............... | H01R 13/508 174/481 |
| 8,415,562 B2 * | 4/2013 | Curtin | ............... | H02G 3/185 174/50 |
| 8,629,348 B2 * | 1/2014 | Moselle | ............... | E04B 9/001 174/50 |
| 8,648,256 B1 * | 2/2014 | Rose | ............... | H02G 3/14 174/481 |

OTHER PUBLICATIONS

Office Action, dated Feb. 27, 2015, in connection with U.S. Appl. No. 14/147,091.

* cited by examiner

FIREWALL INSERT BOX

CROSS REFERENCE TO RELATED APPLICATIONS

This application is a continuation of prior U.S. patent application Ser. No. 15/611,484, entitled "FIREWALL INSERT BOX" and filed Jun. 1, 2017, which is a continuation of U.S. patent application Ser. No. 15/018,619, entitled "FIREWALL INSERT BOX" and filed Feb. 8, 2016, which is a continuation of U.S. patent application Ser. No. 14/147,091, entitled "FIREWALL INSERT BOX" and filed Jan. 3, 2014, the disclosures of which are expressly incorporated herein by reference in their entirety.

BACKGROUND OF THE INVENTION

The invention described herein is designed to solve a common problem faced in building construction; namely, the placement of electrical boxes containing electrical or electronic devices such as duplex receptacles, switches or media plugs into mandated fire walls in commercial buildings. Local, state, and national fire codes place constraints on where such boxes can be located and the ASTM E-119 vertical wall test is used to test the resilience of these firewalls against direct heat, smoke, and gases. What is needed is a quickly and easily retrofittable fire safety device that will allow new and already-existing electrical boxes in firewalls to pass the ASTM E-119 one- and two-hour fire tests.

BRIEF SUMMARY OF THE INVENTION

The firewall box insert described herein is designed for use in conjunction with existing electrical boxes in a wall or fixture boxes located in a ceiling. It is also applicable to low-voltage applications. It functions as a barrier against direct heat, smoke, or gases penetrating through openings in a firewall such as the small gaps between a firewall and an electrical box located in the firewall. It consists of an insert having a back, sides, and a flanged open end that nests easily and quickly within existing electrical boxes. The flanged open end covers and seals any gaps existing between a cut in a wall (e.g. in gypsum drywall) and the existing electrical box. This is an important feature that stops heat or gases and smoke from penetrating into the gap between the cut drywall and the outside of the existing device box. If the flange is metallic it blocks the direct path for heat and gases; if the flange is partially or entirely of intumescent material it swells into the gap, which also seals the gap from heat or gases and smoke. This gives protection both inside and outside of the device box.

When the insert is installed, it effectively divides the existing electrical device box into two sections. The first section which is entirely within the insert box contains an electrical or electronic device such as a switch or an outlet. The second section is outside of the insert box but inside the existing electrical device box and contains the wires leading to the electrical or electronic device. The back side of the box insert contains holes through which wires pass. In certain embodiments, however, the back side of the box insert features a female wire harness. Specially-designed electrical devices having a male compliment to the female harness could then be seated firmly into the female harness, which would obviate the need for wires penetrating into the box itself, further improving fire protection.

The insert box is constructed entirely of sheet metal capable of maintaining its structural integrity in the presence of at least 2000 degrees F. of direct heat as specified in ASTM E-119 (furnace gets to 1850 deg F.). It can also be constructed entirely of intumescent plastic, such as that manufactured by Pyrophobic Systems Ltd. of Barrie, Ontario. However, one embodiment is comprised of sheet metal in conjunction with an intumescent plastic, which maximizes both structural integrity and fire and smoke protection.

BRIEF DESCRIPTION OF THE DRAWINGS

FIG. 2 is a profile view of one embodiment of the invention featuring holes in the back of the insert permitting individual wire leads to pass through.

DETAILED DESCRIPTION OF THE INVENTION

The invention described in this application is a fire safety device that is easily retrofittable into existing electrical boxes or installable in new electrical boxes located in building firewalls that are required to be tested to the standards set forth in ASTM E-119. In this application, reference to "existing electrical box(es)" shall refer to either an existing electrical box located in a wall or a fixture box located in a ceiling, and "electrical device" shall mean any electric or electronic device or fixture, including but not limited to duplex outlets, switches, media or other low voltage devices, or lighting fixtures. Therefore, although the embodiments herein are described in the context of installation in a wall, these embodiments are equally applicable to ceiling (or even floor) installations. Further, those skilled in the art will appreciate that electrical device boxes are often round or octagonal when located in ceilings or floors. Therefore, while the embodiments are described in terms of a five-sided box shaped insert designed to fit within a conventional electrical box locate in a wall, one skilled in the art will appreciate the modifications to the embodiments enumerated herein necessary to adapt the invention to round or octagonal boxes, or even boxes of other shapes.

Figure 1:
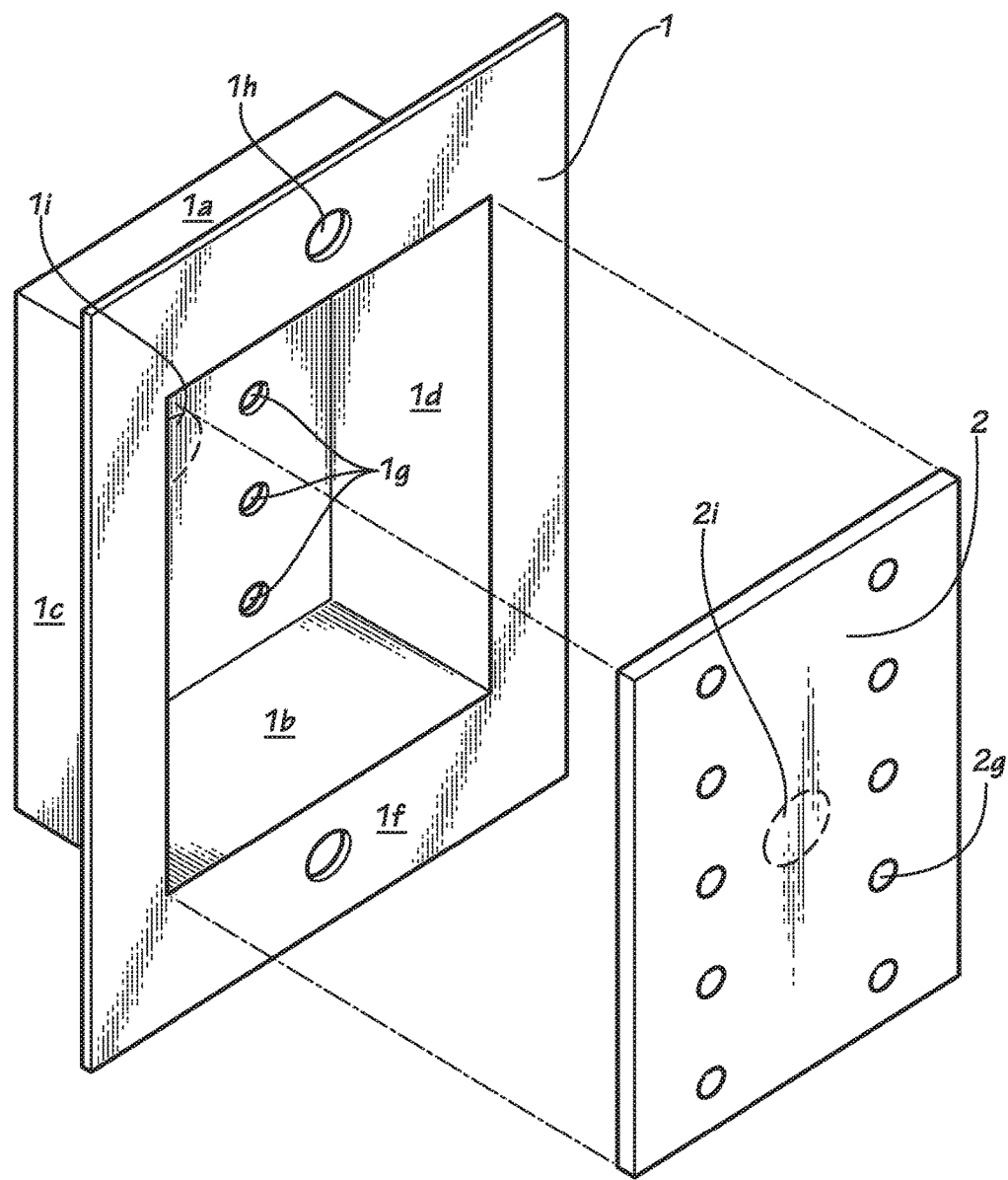
FIG. 1 shows one embodiment of the invention, along with an intumescent pad that can be used in conjunction with the firewall box insert.

FIG. 1 shows the overall layout of one embodiment of the insert box, 1. The insert box 1 is a five-sided box having a top side wall 1a, bottom side wall 1b, left side wall 1c, right side wall 1d, and back wall 1e, having a flange 1f. This particular embodiment features a set of holes 1g in the insert's back wall 1e which permit wire leads from the electrical box to pass into the insert box 1. Holes 1g are typically ¼ inch in diameter. In certain embodiments, holes 1g are perforated into the sheet metal, permitting these holes to be easily punched out with an awl, in order to allow installation personnel to punch out only those holes that are needed. Certain embodiments also have a center punch-out hole 1i that is typically ⅜ inch in diameter, to accommodate low-voltage wires. Insert box 1 in one preferred embodiment is made of deep drawn (i.e. bent in a mold) sheet metal of 24-28 gauge thickness that is capable of withstanding direct heat of at least 2000 deg F. while maintaining its structural integrity (e.g. without melting or experiencing significant deformation). Commonly-available sheet steel alloys satisfy this requirement. In certain embodiments, flange 1f typically has two or more holes 1h to accommodate device and insert box fastening screws. Not shown in FIG. 1 are one or more holes in flange 1f to accommodate screws or other fasteners used to fasten the insert box 1 to the nearest wall stud (or to a joist if the electrical box is located in a ceiling or floor).

Insert box 1 is sized to accommodate a particular electrical device 3. For example, in the embodiment shown in FIGS. 1 and 2, to accommodate a duplex receptacle, flange 1f is 1⅞ inch wide by 2⅞ inch long, with the flange width being 7/16 inch on each side and top and bottom widths of ¾ inch. Although the flange width may be limited by aesthetic considerations (i.e. the flange must be covered by the electrical device's face plate), it is important that the flange widths are sized so that flange 1f completely covers any gap 5 between the wall 6 and the existing electrical box 4 to prevent passage of heat or gases and smoke through this gap.

In another embodiment, insert box 1 is composed of sheet metal that has been coated with intumescent plastic material such as that manufactured by Pyrophobic Systems Ltd. of Barrie, Ontario. The advantage of this embodiment is that the intumescent plastic will swell upon exposure to heat, which will seal the gaps between holes 1g and the wires penetrating through these holes, which prevents heat and gases from escaping. In yet other embodiments, insert box 1 can be composed entirely of intumescent plastic, although the structural integrity of these insert box embodiments comprised entirely of intumescent plastic will be severely compromised upon prolonged exposure to direct heat.

The fire protection of the insert box can be further enhanced by placing a pad 2 made of intumescent plastic material inside the insert box. Pad 2 is shaped to fit snugly against the back 1e of insert box 1. Pad 2 contains holes 2g corresponding to holes 1g in insert box 1, as well as a punch-out hole 2i corresponding to hole 1i in the insert box 1. Holes 2g are slightly smaller in diameter, e.g. 5/32" in diameter, which allow #12 wire gauge or smaller to pass through. Pad 2 is typically ⅛" thick.

Figure 2:
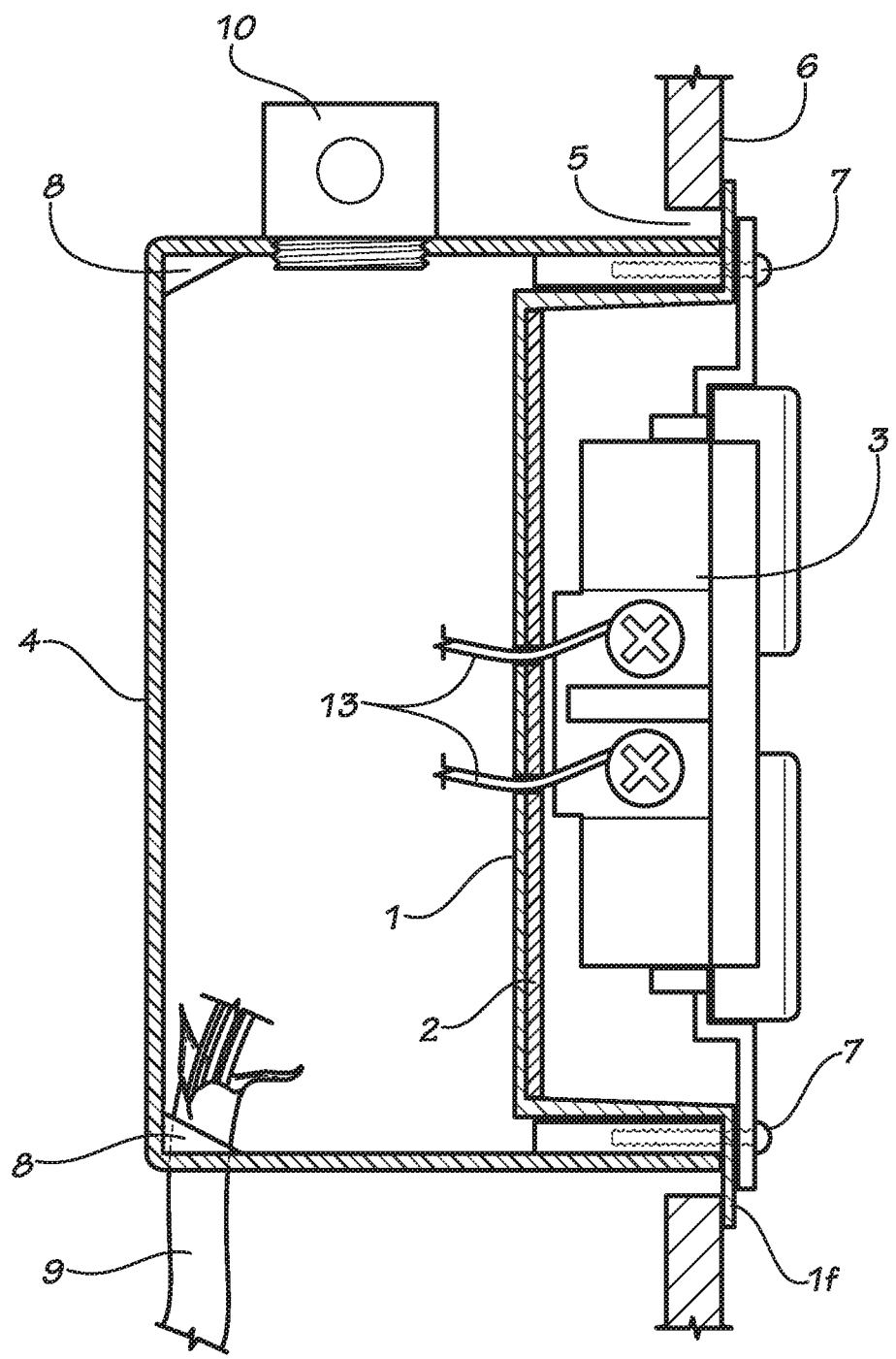

FIG. 2 shows an electrical device 3 (i.e. a duplex receptacle) mounted inside insert box 1 (shown with pad 2 installed). Insert box 1 is mounted inside the existing electrical box 4 so that flange 1f overlaps gap 5 between electrical box 4 and wall 6 and blocks direct heat or gases and smoke from passing through. In this embodiment, screw 7 (or a comparable fastener) are used to attach the electrical device 3 to the insert box 1. The typical electrical box 4 will have one or more holes 8 through which wire cable 9 may pass. Alternatively, the wire cable 9 may enter through a conduit fitting 10. Wire cable 9 typically contains a grounding wire, which can be attached to the back side of back wall 1e (i.e. on the back of insert box 1) using a screw or other bonding mechanism, thus grounding the electrical device 3.

Figure 3:
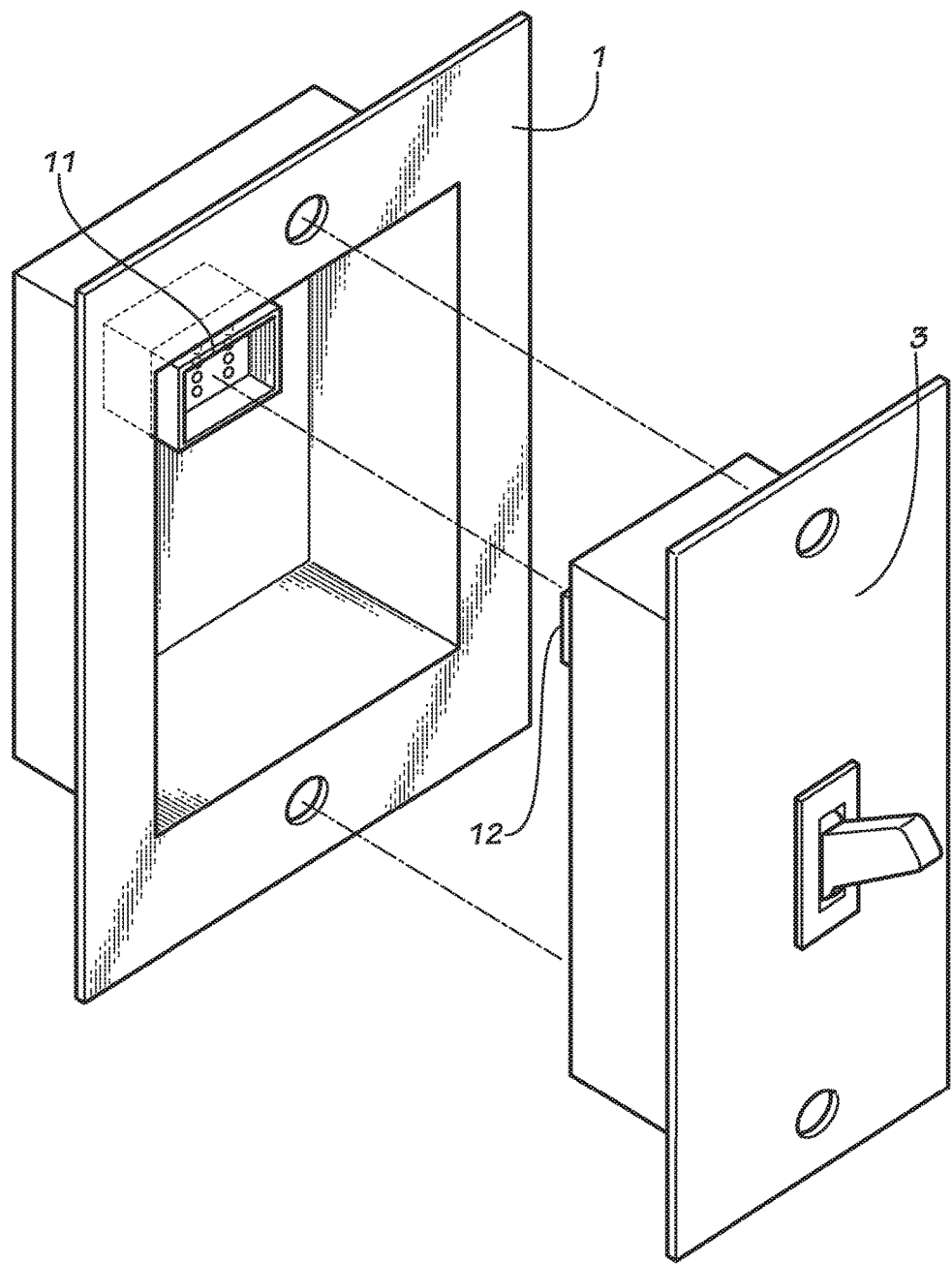
FIG. 3 shows one embodiment of the invention featuring a wire harness assembly obviating the need for wire penetrations in the back of the insert.
Figure 4:
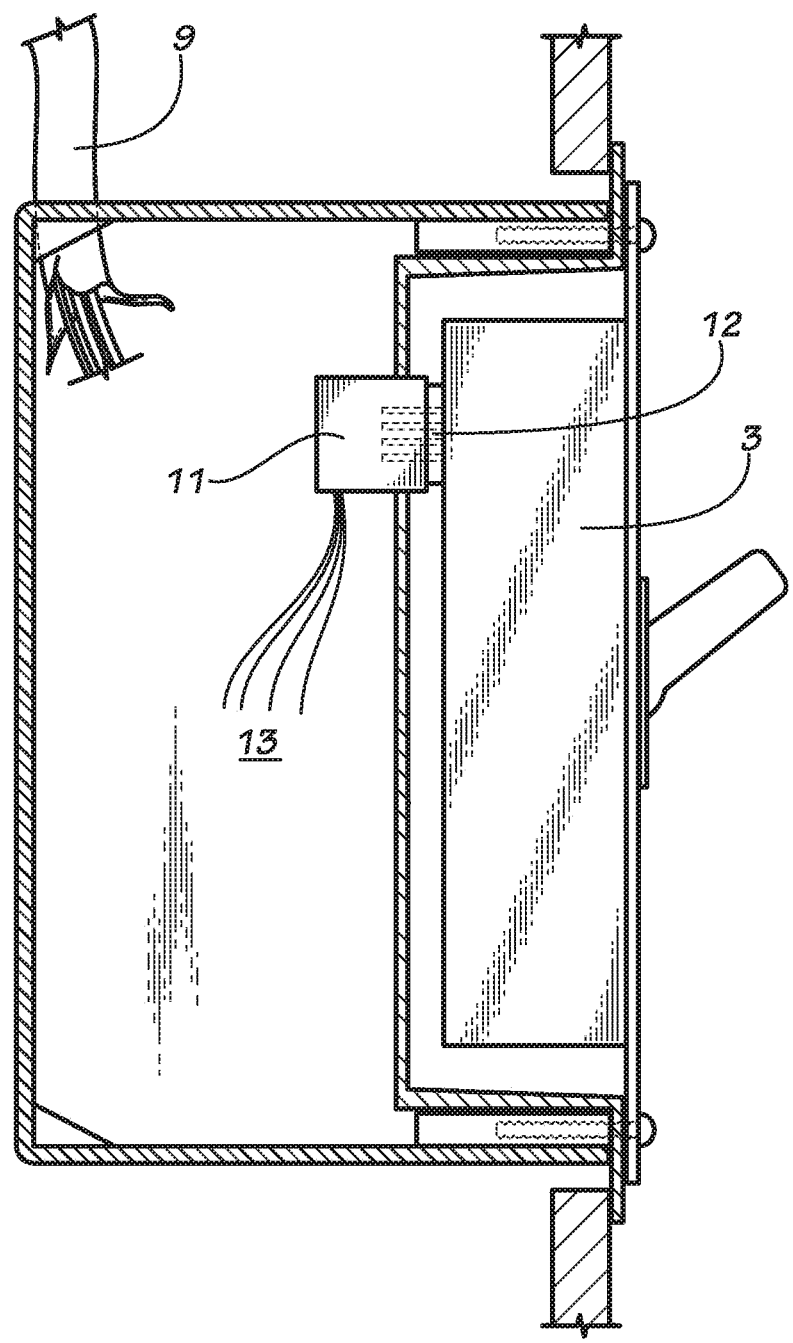
FIG. 4 is a profile view of the embodiment in FIG. 3, showing how an electrical device having a male plug fits into an insert box having a wire harness assembly.

FIG. 3 shows an alternative embodiment of insert box 1 in which holes 1g, 1i are replaced by a female wire harness plug 11 embedded in the back wall 1e which mates with a corresponding male plug 12 connected to electrical device 3. The advantage of this embodiment is that there are no holes in back wall 1e allowing heat or gases and smoke to pass through. It is also easier to install electrical device 3 since it can be plugged directly into the back wall of the insert box in lieu of having to attach individual wire leads 13 individually (i.e. as shown in FIG. 2). FIG. 4 shows that individual wire leads 13 from wire cable 9 are attached to corresponding leads within female wire harness plug 11.

Figures 5, 6:
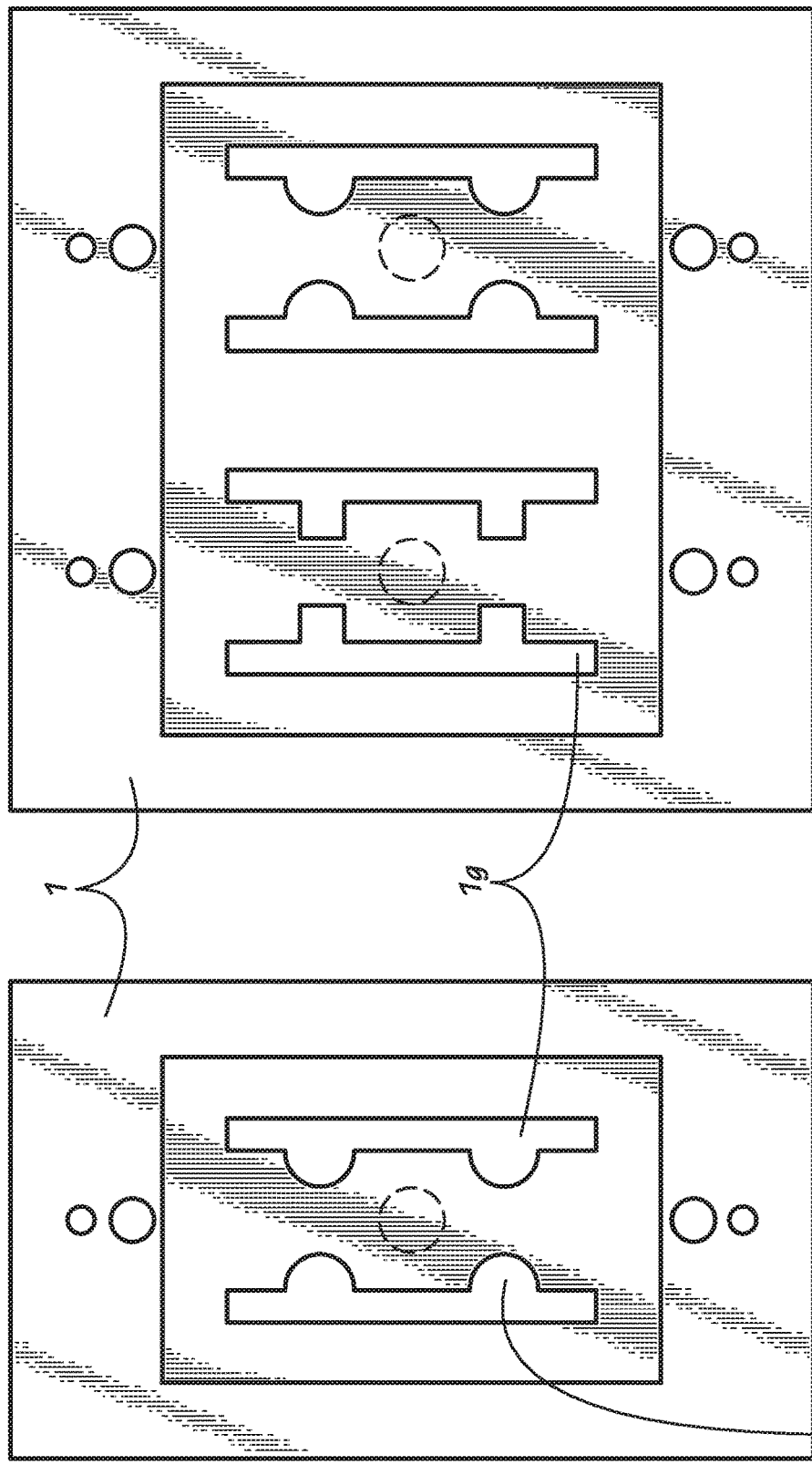
FIG. 5 shows wire penetrations in the back of the insert box in one embodiment of the invention.
FIG. 6 shows wire penetrations in an embodiment of the insert box featuring two electrical devices.

In certain embodiments of the invention, the holes 1g in back wall 1e are replaced by elongated openings (e.g. slots) such as those shown in FIGS. 5 and 6. These elongated openings may be necessary in certain applications where it is not practical to fit the individual wires 13 into the holes 1g shown in FIGS. 1 and 2. These holes line up with the screws used to connect individual wires 13 to the electrical device 3. Half-moon shaped (or square) cutouts are used to compensate for small variations in screw placement in different electrical devices 3 and further facilitate installation. Because of the greater potential for heat and gases to pass between the gaps between these larger openings and the individual wires, it is highly desirable in this embodiment to use pad 2 made of intumescent material, which will swell in the presence of heat and seal these gaps.

Figure 8:
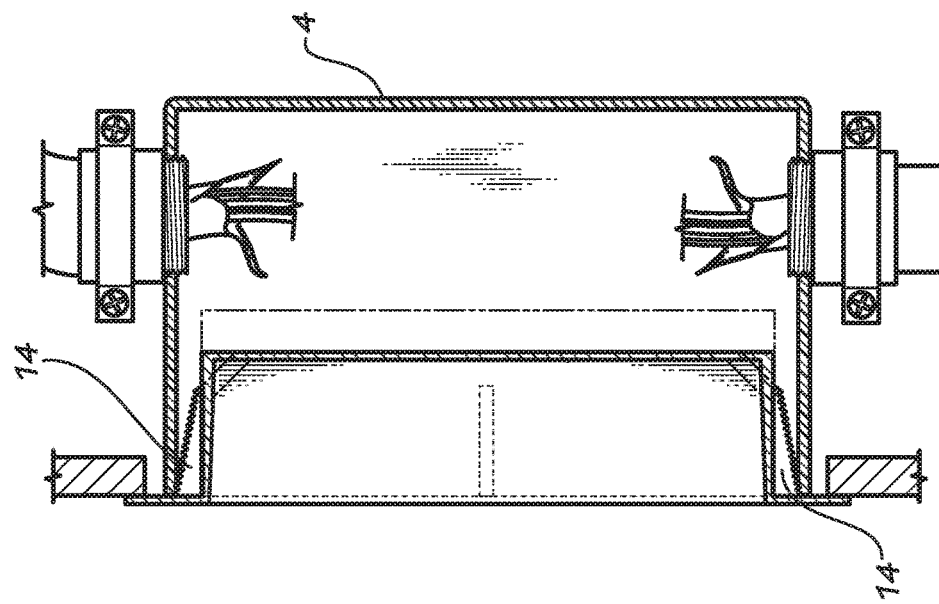
FIG. 8 is a profile view of the embodiment shown in FIG. 7.
Figure 7:
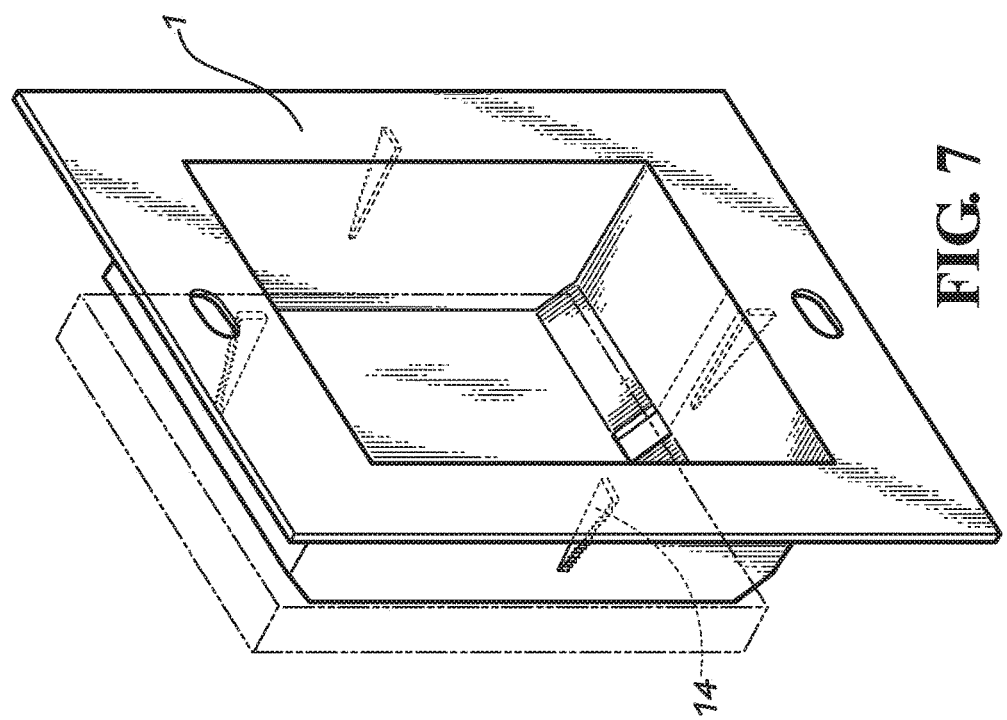
FIG. 7 shows an embodiment of the insert box featuring frictional locking tabs.

In yet another embodiment of the invention shown in FIGS. 7 and 8, locking tabs 14 are used to hold insert box 1 in place inside the existing electrical box 4 during installation of electrical device 3. The use of these locking tabs facilitates the installation of the insert box 1 by holding it in place in electrical box 4. This makes connecting the wire leads 13 to electrical device 3 easier because insert box 1 is held in place while wire leads 13 are connected. Once wire leads 13 are connected to electrical device 3, screws 7 are then used to firmly fasten the electrical device 3 to the insert box 1.

Thus, to install insert box 1, the installer would first thread wire leads 13 through the holes 1g in the back wall 1e. Then, insert box 1 is pushed into existing electrical box 4 so that locking tabs 14 engage the sides of the electrical box as shown in FIG. 8. The wire leads 13 can then be attached to their corresponding terminals on electrical device 3.

As shown in FIG. 7, locking tabs 14 may be made of plastic or metal; although the material comprising the locking tabs 14 should be capable of withstanding the same temperatures as the material comprising insert box 1 itself, in order to maintain the structural integrity of the overall box-insert assembly. Two sides of the locking tabs 14 are attached to or integral with both the sides and flange of insert box 1. The third side is serrated in one embodiment so that the locking tabs 14 engage the inside wall of the existing electrical box 4 to hold the insert box 1 firmly in place.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A fire protection device, comprising:
an insert box having at least one back wall, at least one flange, and at least one side wall extending from the at least one back wall to the at least one flange, the at least one side wall defining a cavity sized to accommodate at least one electrical device associated with an existing electrical box, wherein the at least one back wall has one or more openings sized to permit individual electrical leads to pass through the at least one back wall;
at least one locking tab disposed external to the cavity and extending from the at least one flange to the at least one side wall; and
a pad of intumescent material that is in communication with the at least one back wall and having a second set of one or more openings congruent with and corresponding to the one or more openings located in the at least one back wall,
wherein the insert box is adapted to fit within the existing electrical box such that the locking tabs engage a portion of the existing electrical box, and
wherein the at least one flange overlaps any gaps between the existing electrical box and a wall.

2. The fire protection device of claim 1, wherein the at least one back wall contains a female wire harness plug connectable to a corresponding male wire harness located in the at least one electrical device.

3. The fire protection device of claim 2, wherein the female wire harness plug is comprised of an intumescent material.

4. The fire protection device of claim 3, wherein wire leads connected to the female wire harness plug are surrounded with intumescent plastic.

5. The fire protection device of claim 1, wherein the insert box is comprised entirely of sheet metal.

6. The fire protection device of claim 1, wherein the insert box is comprised entirely of intumescent plastic.

7. The fire protection device of claim 1, wherein the insert box is comprised of a combination of sheet metal and intumescent plastic.

8. The fire protection device of claim 1, wherein the at least one locking tab is integrally coupled to the insert box.

9. The fire protection device of claim 1, wherein the at least one locking tab are affixed to the insert box.

10. The fire protection device of claim 1, wherein the at least one locking tab comprises metal.

11. The fire protection device of claim 1, wherein the at least one locking tab comprises plastic.

12. The fire protection device of claim 1, wherein the at least one locking tab comprises serrations.

13. The fire protection device of claim 1, wherein the at least one locking tab comprises three sides, the first side being coupled to the at least one side wall, the second side being coupled to the at least one flange, and the third side extending from the at least one flange to the at least one side wall.

14. The fire protection device of claim 13, wherein a portion of the third side of the locking tab comprises serrations.

15. The fire protection device of claim 1, wherein the insert box comprises four side walls.

16. The fire protection device of claim 15, wherein the at least one locking tab comprises four locking tabs and one locking tab is coupled to each of the four side walls.

* * * * *